United States Patent [19]
Adamson et al.

[11] Patent Number: 5,361,282
[45] Date of Patent: Nov. 1, 1994

[54] DIMENSIONALLY STABLE AND CORROSION-RESISTANT FUEL CHANNELS AND RELATED METHOD OF MANUFACTURE

[75] Inventors: Ronald B. Adamson, Fremont, Calif.; Donald C. Bartosik, Wilmington, N.C.; Eric B. Johansson, Wrightsville Beach, N.C.; Cedric D. Williams, Wilmington, N.C.

[73] Assignee: General Electric Company, San Jose, Calif.

[21] Appl. No.: 60,669

[22] Filed: May 13, 1993

[51] Int. Cl.$^5$ ................................................ G21C 3/32
[52] U.S. Cl. .................................... 376/443; 376/439; 376/442
[58] Field of Search ................ 376/443, 439, 442; 976/DIG. 282

[56] References Cited

U.S. PATENT DOCUMENTS

| | | | |
|---|---|---|---|
| 3,865,635 | 2/1975 | Hofvenstam et al. | 148/11.5 F |
| 3,986,654 | 10/1976 | Hart et al. | 228/155 |
| 4,238,251 | 12/1980 | Williams et al. | 148/133 |
| 4,450,016 | 5/1984 | Vesterlund et al. | 148/11.5 F |
| 4,450,020 | 5/1984 | Vesterlund | 148/11.5 F |
| 4,604,785 | 8/1986 | Eddens | 29/463 |
| 4,749,543 | 6/1988 | Crowther et al. | 376/443 |
| 4,749,544 | 6/1988 | Crowther et al. | 376/443 |
| 4,989,433 | 2/1991 | Harmon et al. | 72/38 |
| 5,027,635 | 7/1991 | Wilks | 72/342.7 |
| 5,104,609 | 4/1992 | Okuyama et al. | 376/442 |
| 5,211,908 | 5/1993 | Verdier | 376/442 |
| 5,253,278 | 10/1993 | Kanazawa et al. | 376/434 |

FOREIGN PATENT DOCUMENTS 1537930 of 1979 United Kingdom.

OTHER PUBLICATIONS

Supplementary Information on WPI Printout Item No. 58; Abstracts.
Supplementary Information on WPI Printout Item No. 60; Abstracts.
Printout: Derwent World Patent Index References; Miscellaneous references; 35 pages.
Printout: JAPIO References; Miscellaneous references; 7 pages.
Supplementary Information on JAPIO Printout Item No. 9; Abstract from WPI.
Supplementary Information on WPI Printout Item No. 31; Abstracts from JAPIO.
Supplementary Information on WPI Printout Item No. 39; Abstract.
Supplementary Information on WPI Printout Item No. 56; Abstracts.

*Primary Examiner*—Donald P. Walsh
*Assistant Examiner*—Frederick H. Voss
*Attorney, Agent, or Firm*—J. S. Beulick

[57] ABSTRACT

A method of manufacturing fuel channels made of zirconium-based alloy by combining heat treatment, warm forming and thermal sizing. Fuel channel strip material is heated to a temperature which initiates the transformation from a hexagonal close-packed to a body-centered cubic crystallographic phase and then quenched at a rate which initiates transformation to a hexagonal close-packed crystallographic phase having a texture factor $f_L = 0.28-0.38$. The heat-treated strips are formed into fuel channel components by bending at an elevated temperature sufficient to increase the ductility of the strip material. After the fuel channel components are welded together, the fuel channel is annealed by thermal sizing.

20 Claims, No Drawings

DIMENSIONALLY STABLE AND CORROSION-RESISTANT FUEL CHANNELS AND RELATED METHOD OF MANUFACTURE

FIELD OF THE INVENTION

This invention generally relates to a method for manufacturing hollow, thin-walled, precisely dimensioned components for use in a nuclear reactor. In particular, the invention relates to a method for manufacturing fuel channels made from metal alloy, such as zirconium-based alloy.

BACKGROUND OF THE INVENTION

A boiling water reactor (BWR) has nuclear fuel assemblies comprising bundles of fuel rods made of fissionable materials capable of releasing a finite number of neutrons. Neutrons are released due to fission at high speed and then moderated by the water to a lower speed at which the neutrons can produce a chain reaction of fission events. Each fuel assembly is surrounded by a fuel channel made of metal which parasitically absorbs neutrons. To minimize parasitic absorption of neutrons, fuel channels are typically fabricated from a metal alloy known as Zircaloy, which absorbs very few thermal neutrons, i.e., has a low absorption cross section. Zircaloy is an alloy of zirconium with small amounts of iron, tin and other alloy metals. In particular, Zircaloy-2 contains about 1.5% tin, 0.15% iron, 0.1% chromium, 0.05% nickel and 0.1% oxygen, whereas Zircaloy-4 contains substantially no nickel and about 0.2% iron but otherwise is similar to Zircaloy-2.

Fuel channels are hollow elongated components of generally square cross section, which may measure approximately 6 inches on each side and on the order of 14 feet in length. Typically, the channels are created by rolling strips of Zircaloy, bending the strips into U-shaped channel sections and then seam welding two U-shaped channel sections together to form a single fuel channel. Reactor control occurs typically on the exterior of such fuel channels. To optimize nuclear reactor control, the fuel channels are formed with flat sides which conform to the shapes of the control rods.

The fuel channels also serve the purpose of confining the coolant water flowing through the nuclear core to a predictable flow path around the steam-generating fuel rods. To assure predictable water flow in the reactor, there is a pressure differential between the inside and the outside of the fuel channels. The water flowing inside the fuel channel is turned into steam by the heat released during fission. The outside of the fuel channel constitutes a different pressure environment.

The planar fuel channel walls are connected by corners and tend to bulge responsive to the pressure differential. This tendency to bulge is additionally aggravated by thermal effects and also by radiation. In-reactor dimensional changes of a fuel channel are primarily a result of: 1) stress relaxation of manufacturing-induced stresses; 2) radiation-induced growth; and 3) radiation-enhanced creep. The radiation-induced growth can lead to dimensional changes such as longitudinal bow if the channel strip contains variations in crystallographic texture and resides in a region with neutron flux gradients. In particular, conventional fuel channels having a uniform crystallographic texture, i.e., $f_L \approx 0.10$ everywhere in the fuel channel, will bow in a flux gradient.

Irradiation also decreases the ductility and increases embrittlement of the Zircaloys. The magnitude of the radiation effect is partly dependent on the microstructure (or "texture") of the alloy. Because the hexagonal close-packed phase in the Zircaloys is anisotropic, different fabrication processes will yield products with different textures. Therefore, the radiation embrittlement of Zircaloy is dependent on its fabrication history.

Since in-reactor dimensional stability and corrosion resistance are important attributes of a BWR fuel channel, it is imperative that these fuel channels be manufactured to the proper dimensions and be free of geometric irregularities, such as face or side bulge, out-of-square cross section, non-parallelism of sides, longitudinal bow and twist, and the like. However, the channel creating step leaves residual manufacturing stresses which lead to geometric irregularities. Therefore, it is conventional practice to subject fuel channels to thermal sizing to eliminate these stresses.

The use of thermal sizing is well established in the fabrication of precisely dimensioned components and in various other processes. This technique takes advantage of differences in the coefficients of thermal expansion of different metals. An elongated, close-fitting mandrel having a coefficient of thermal expansion greater than that of the component to be sized is inserted into the component. This assembly of the component and mandrel is then heated to a temperature of about 1100° F. in an inert atmosphere, e.g., in a vacuum or in an inert gas such as argon. As the mandrel expands at a greater rate than the component, the former plastically deforms the latter to the desired dimensions while relieving manufacturing stresses. The assembly is then cooled and the mandrel is removed. Thermal sizing techniques are disclosed in U.S. Pat. No. 4,989,433 to Harmon et al. and U.S. Pat. No. 4,604,785 to Eddens, both assigned to the assignee of this patent application, and in U.S. Pat. No. 3,986,654 to Hart et al. The contents of these patents are incorporated by reference herein.

High corrosion resistance for the Zircaloys is conventionally obtained by heating the channel material to an elevated temperature followed by fast quenching, e.g., by inductive heating and water quenching. For Zircaloy-2 the process involves quenching at an intermediate slab thickness and controlling subsequent thermal exposure during strip manufacture.

Such a heat treatment is disclosed in U.S. Pat. No. 4,238,251 to Williams et al., assigned to the assignee of this patent application and the contents of which are incorporated herein by reference. This patent discloses that in components made of zirconium-based alloys, a strong correlation exists between a particular microstructural characteristic and resistance to accelerated pustular corrosion in BWR environments. That characteristic can be produced by heating to redistribute the intermetallic particulate phase [Zr(Cr,Fe)$_2$ in Zircaloy-4 and Zr(Cr,Fe)$_2$, Zr$_2$(Ni,Fe) in Zircaloy-2] in a pattern which imparts the desired corrosion resistance characteristic to the metal. U.S. Pat. No. 4,238,251 teaches that the service life of a zirconium-based alloy component can be greatly increased by heating the component to initiate transformation from alpha (hexagonal close-packed) to beta (body-centered cubic) phase, and then quenching to a temperature substantially below the phase transformation temperature range. While transformation of the alpha phase to the beta phase begins at about 825° C., a somewhat higher temperature, e.g., 870° C., was preferred. Segregation of precipitate particles is obtained to the desired extent by quenching after only a few seconds in the transformation temperature range down to below 700° C.

U.S. Pat. No. 4,238,251 further discloses that rapid cooling enhances the corrosion properties of fuel channels in service in BWRs, without degrading physical properties in general and creep strength and ductility in particular. Preferably, this cooling step involves quenching the component at a rate of at least about 20° C. per second.

Thus, conventional processing techniques use thermal sizing to reduce manufacturing stress or controlled thermal treatment to impart the required corrosion resistance. Considerable effort is also invested in providing what is known in the industry as matched pairs to reduce crystallographic texture variation and minimize differential irradiation growth within channels. However, it has not been known to provide a dimensionally stable and corrosion-resistant fuel channel by heat treatment of the channel strip material, warm forming of the channel components and thermal sizing of the assembled channel.

SUMMARY OF THE INVENTION

The present invention improves upon conventional methods for manufacturing components made of zirconium-based alloy by combining heat treatment with thermal sizing to produce a component ideally having a random crystallographic texture, i.e., $f_L = f_N = f_T \approx 0.33$, everywhere in the fuel channel, where $f_L$, $f_N$, $f_T$ are the fractions of hexagonal crystals having basal poles which are generally oriented parallel to the longitudinal, normal and transverse directions respectively. (For strip, the longitudinal direction is the rolling direction and the normal direction is perpendicular to the plane of the strip. For tubing, the longitudinal direction is along the axis of the tube, the normal direction is the radial direction and the transverse direction is the circumferential direction.)

In practice, the benefits of the invention are obtained without the need for random texture provided that $f_L$ is high, i.e., $f_L = 0.28 – 0.38$. Zirconium-based alloys having a high-$f_L$ crystallographic texture in accordance with the invention form components having improved dimensional stability and excellent reactor corrosion resistance.

In accordance with the preferred embodiment of the invention, the method of manufacturing components of zirconium-based alloy comprises a sequence of steps, including a heat-treatment method for channel strip which provides the required control of crystallographic texture and alloy microstructure; a warm forming process in which the forming temperature is controlled to minimize the residual stresses in the formed parts, and in which surface oxidation is also controlled within a level acceptable for subsequent processing; and a thermal sizing process which brings the channel box to the required dimension with minimal residual stress.

More specifically, the channel manufacturing process in accordance with the preferred embodiment of the invention proceeds as follows:

(1) The channel strip, of uniform thickness or having variations in thickness as required by specific designs, is heat-treated. The heat treatment comprises heating the strip to a temperature which initiates transformation from a hexagonal close-packed crystallographic phase having a uniform texture to a body-centered cubic crystallographic phase and then quenching (using gas or water) to a quench temperature at a rate which initiates transformation to a hexagonal close-packed crystallographic phase having a high-$f_L$ texture. Thereafter, the surface condition of the heat-treated strip material is brought to a condition suitable for subsequent fabrication. In this manner the strip is provided with a required degree of randomness in crystallographic orientation (texture), and with a finely distributed intermetallic particle population and matrix alloy chemistry required for high resistance to in-reactor corrosion in BWRs.

(2) The heat-treated channel strip is subjected to a warm forming operation under conditions in which surface oxidation is minimized, for example, using temperature and time controls, either alone or in conjunction with an inert gas protective atmosphere. In this way the strip is formed into the components of a channel box, suitable for welding into one assembly using conventional seam welding techniques.

(3) The welded channel box is then thermally sized to the required dimensions by heating using a mandrel constructed of an alloy having a higher thermal coefficient of expansion than that of the Zircaloy. The thermal sizing comprises heating the component to a temperature less than the heat treatment quench temperature, but sufficient to anneal the component, and then cooling. This thermal sizing eliminates manufacturing stresses and ensures accurate size control. During this sizing process, the channel box is protected from extensive oxidation by an inert gas atmosphere or by enclosing the channel/mandrel assembly in a vacuum system.

This processing will result in improved in-reactor dimensional stability by eliminating manufacturing stresses, reduced in-reactor growth due to the texture randomization, and improved nodular and uniform corrosion resistance. The method is especially suited for the manufacture of fuel channels made from Zircaloy for a BWR. However, the method could also be used to make nuclear fuel cladding, fuel rod spacers for use in a fuel channel or any other component made from zirconium-based or similar alloy.

DETAILED DESCRIPTION OF THE PREFERRED EMBODIMENTS

The method of manufacturing a fuel channel of a zirconium-based alloy for a BWR in accordance with the preferred embodiment of the invention comprises three steps performed in the following sequence: (1) high-temperature heat treatment (heating and quenching) of channel strip material to impart excellent corrosion resistance and to randomize the crystallographic texture; (2) warm forming the heat-treated channel strip into fuel channel components under conditions in which surface oxidation is minimized and then seam welding the components to form the fuel channel; and (3) thermal sizing of the fuel channel to eliminate manufacturing stresses and ensure accurate size control.

The strip material is formed by any conventional channel strip fabrication technique, for example, forging, extrusion or rolling. Each strip has a width such that the strip can be bent to form one of two components conventionally welded together to form the desired fuel channel.

The heat treatment of the strip is carried out utilizing an induction heating coil or any other conventional heating means, such as radiation, convection or resistance heating. Heating is preferably done in a vacuum. The fuel channel is heated to a temperature of 1800° F. or greater (with a practical upper temperature limit of 2050° F.) and held at a temperature equal to or greater than 1800of for a period in the range of 0.25 sec to 30 min. The purpose of this high-temperature heating is to induce a full transformation of the crystalline structure of the zirconium-based alloy of the channel strip material from the alpha phase (hexagonal close-packed) to the beta phase (body-centered cubic).

After the strip material has been maintained at a temperature equal to or greater than 1800° F. for a time duration equal to at least the minimum, i.e., 0.25 sec, the strip material is quenched with a fluid to a temperature of 1500° F. or less at a rate in the range from 10° F./sec to 400° F./sec. The strip may be cooled by inert gas, air, water or other suitable quenching medium. The preferred quenching fluid is an inert gas such as helium, rather than water which is prone to contain contaminants such as dissolved $O_2$.

During rapid quenching, the crystallographic structure of the zirconium-based alloy is transformed from grains of beta phase to grains of alpha phase having a high-$f_L$ crystallographic texture. In particular, the structure of the zirconium-based alloy obtains a crystallographic orientation with a texture factor $f_L$ approximately equal to ⅓, i.e., $f_L$=0.28-0.38. The rapid cooling rate (10°-400° F./sec) is required to yield a highly corrosion-resistant material.

After heat treatment, the surface condition of the strip material is brought to a condition suitable for subsequent fabrication. In particular, any lubricants or any contaminants deposited from the air onto the surface are removed during subsequent processing steps so that no contamination will be baked into cracks, fissures and other microscopic mechanical damage to which the surface is prone.

The strip material is then bent into the desired shape by any one of various conventional techniques, e.g., by the use of a bending brake, to form a channel component of substantially U-shaped cross section. Each component has a base wall and two mutually facing side walls. Each side wall includes a longitudinal edge surface. Prior to bending, the channel strip is heated to a temperature in the range of 50° F. to 800° F. (preferably 250° F. to 400° F.), under conditions where surface oxidation is minimized, for example, using temperature and time controls, either alone or in conjunction with an inert gas protective atmosphere. The temperature and time of exposure are minimized to reduce the risk of cracks, fissures and other microscopic mechanical damage to the Zircaloy surface. Warm forming (i.e., heating before bending) serves two purposes. The primary purpose is to improve ductility, thereby facilitating the bending operation. A secondary purpose is to lower residual stresses, thereby improving fabricability. However, in accordance with an alternative preferred embodiment of the invention, bending can be done without prior heating.

After the warm forming operation, a pair of channel components are positioned so that their longitudinal edge surfaces abut along their entire length. Then the abutting edge surfaces are welded together, e.g., by tungsten inert gas welding or any other conventional channel welding technique, to form a hollow fuel channel having a substantially uniform rectangular cross section. Upon completion of the welding operation, any weld beads formed along the weld seam inside or outside the fuel channel are reduced to the extent desired by a conventional technique known as planishing.

After the channel is assembled by welding, the fuel channel undergoes thermal sizing. In the thermal sizing operation, a conventional mandrel consisting of a material with a thermal coefficient of thermal expansion larger than that of the zirconium-based alloy is inserted into the fuel channel. The mandrel has geometric dimensions corresponding to the final dimensions of the fuel channel. The mandrel/fuel channel assembly is then heated to a temperature of 1000° F. to 1250° F., held in this temperature range for a time duration of 15 min to 10 hr and then cooled. After cooling, the mandrel is removed from the fuel channel.

It is critical to avoid contamination of the Zircaloy surface and the formation of oxides and nitrides thereon during thermal sizing. Due to the high reactivity of Zircaloy with oxygen and nitrogen, the fuel channel is preferably protected from extensive oxidation during thermal sizing by an inert gas medium or by enclosing the channel/mandrel assembly in a vacuum system.

The resulting fuel channel has a fully annealed (no internal stresses) high-$f_L$ crystallographic structure and precise dimensions. The fuel channel is thereafter subjected to a combination of conventional chemical and mechanical surface conditioning steps as required to meet design and quality requirements. In particular, chemical etching and grit blasting are used to remove oxides from the fuel channel surface.

Zircaloy BWR fuel channels manufactured according to the above-prescribed processing limits will exhibit an excellent corrosion resistance and a high-$f_L$ crystallographic texture that provides in-reactor dimensional stability. The method is especially suited for the manufacture of fuel channels made from Zircaloy for a BWR. However, the method could also be used to make fuel rod spacers for use in a fuel channel or any other component made from zirconium-based alloy. Moreover, the product by process of the present invention is not limited to components made from zirconium-based alloy. On the contrary, the invention encompasses any component made from a metal which can be heated to a body-centered cubic (beta) phase, then quenched to a hexagonal close-packed (alpha) phase having high-$f_L$ crystallographic texture and subsequently annealed.

Further, benefit is derived from heat treatment of the channel strip material and thermal sizing of the assembled channel regardless of whether warm forming or cold forming is used to form the channel components.

These and other variations and modifications of the disclosed preferred embodiment will be readily apparent to practitioners skilled in the art of fuel channel manufacture. All such variations and modifications are intended to be encompassed by the claims set forth hereinafter.

We claim:

1. A method for manufacturing a dimensionally stable and corrosion-resistant fuel channel, comprising the steps of:

forming first and second strips of material comprising metal alloy in a hexagonal close-packed crystallographic phase having a uniform texture;

subjecting said first and second strips to heat treatment by heating to a first temperature which initiates transformation from said hexagonal close-packed crystallographic phase to a body-centered cubic crystallographic phase and then quenching to a second temperature at a rate which initiates transformation to a hexagonal close-packed crystallographic phase having a texture factor $f_L = 0.28-0.38$;

forming each of said heat-treated first and second strips into first and second fuel channel components respectively;

seam welding said first and second fuel channel components to assemble a fuel channel; and subjecting said fuel channel to thermal sizing by heating to a third temperature less than said second temperature and sufficient to anneal said material and then cooling.

2. The method as defined in claim 1, wherein said first temperature lies in the temperature range of 1800° F. to 2050° F., said first and second strips are held at a temperature in said temperature range for at least 0.25 sec and said second temperature is no more than 1500° F.

3. The method as defined in claim 1, wherein at least one of said heat treatment and thermal sizing steps is carried out in an inert atmosphere or in a vacuum.

4. The method as defined in claim 1, wherein said quenching is performed using an inert gas as the quenching medium.

5. The method as defined in claim 4, wherein said inert gas is helium.

6. The method as defined in claim 1, wherein said quenching is carried out at a rate of 10° F./sec to 400° F./sec.

7. The method as defined in claim 1, wherein said third temperature is in a temperature range of 1000° F. to 1250° F. and said fuel channel is held at a temperature in said temperature range for at least 15 minutes.

8. The method as defined in claim 1, wherein after said heat treatment and before said first and second fuel channel components are formed, said first and second strips are heated to a fourth temperature sufficient to increase the ductility of said strip material, wherein said fourth temperature is less than said third temperature.

9. The method as defined in claim 8, wherein said fourth temperature lies in a temperature range of 50° F. to 800° F.

10. A method for manufacturing a dimensionally stable and corrosion-resistant fuel channel, comprising the steps of:

forming first and second strips of material comprising metal alloy in a hexagonal close-packed crystallographic phase having a uniform texture;

subjecting said first and second strips to heat treatment by heating to a first temperature in the temperature range of 1800° F. to 2050° F., holding at a temperature no less than said first temperature for no less than 0.25 sec and then quenching to a second temperature not greater than 1500° F.;

warm forming each of said heat-treated first and second strips into first and second fuel channel components respectively by heating said first and second strips to a third temperature sufficient to increase the ductility of said strip material prior to forming;

seam welding said first and second fuel channel components to assemble a fuel channel; and subjecting said fuel channel to thermal sizing by heating to a fourth temperature in a temperature range of 1000° F. to 1250° F., holding at a temperature no less than said fourth temperature for no less than 15 minutes and then cooling, wherein said third temperature is less than said fourth temperature.

11. The method as defined in claim 10, wherein said quenching is performed using an inert gas as the quenching medium.

12. The method as defined in claim 10, wherein said quenching is carried out at a rate of 10° F./sec to 400° F./sec.

13. The method as defined in claim 10, wherein said third temperature lies in a temperature range of 50° F. to 800° F.

14. A dimensionally stable and corrosion-resistant fuel channel made of metal alloy having a hexagonal close-packed crystallographic phase which is stable in a first temperature range and a body-centered cubic crystallographic phase which is stable in a second temperature range different than said first temperature range, formed by the steps of:

forming first and second strips of material comprising metal alloy in a hexagonal close-packed crystallographic phase having a uniform texture;

subjecting said first and second strips to heat treatment by heating to a first temperature which initiates transformation from said hexagonal close-packed crystallographic phase to a body-centered cubic crystallographic phase and then quenching to a second temperature at a rate which initiates transformation to a hexagonal close-packed crystallographic phase having a texture factor $f_L = 0.28-0.38$;

forming each of said heat-treated first and second strips into first and second fuel channel components respectively;

seam welding said first and second fuel channel components to assemble a fuel channel; and subjecting said fuel channel to thermal sizing by heating to a third temperature less than said second temperature and sufficient to anneal said material and then cooling.

15. The fuel channel as defined in claim 14, wherein said metal alloy is zirconium-based alloy.

16. The fuel channel as defined in claim 14, wherein said first temperature lies in the temperature range of 1800° F. to 2050° F., said first and second strips are held at a temperature in said temperature range for at least 0.25 sec and said second temperature is no more than 1500° F.

17. The fuel channel as defined in claim 14, wherein said quenching is carried out at a rate of 10° F./sec to 400° F./sec.

18. The fuel channel as defined in claim 14, wherein said third temperature is in a temperature range of 1000° F. to 1250° F. and said fuel channel is held at a temperature in said temperature range for at least 15 minutes.

19. The fuel channel as defined in claim 14, wherein after said heat treatment and before said first and second fuel channel components are formed, said first and second strips are heated to a fourth temperature sufficient to increase the ductility of said strip material, wherein said fourth temperature is less than said third temperature.

20. The fuel channel as defined in claim 19, wherein said fourth temperature lies in a temperature range of 50° F. to 800° F.

* * * * *